US012249783B2

(12) United States Patent
Iwamoto et al.

(10) Patent No.: US 12,249,783 B2
(45) Date of Patent: Mar. 11, 2025

(54) MULTIPLE COAXIAL CONNECTOR

(71) Applicant: HOSIDEN CORPORATION, Osaka (JP)

(72) Inventors: Yuta Iwamoto, Osaka (JP); Daisuke Sasaki, Osaka (JP)

(73) Assignee: HOSIDEN CORPORATION, Osaka (JP)

(*) Notice: Subject to any disclaimer, the term of this patent is extended or adjusted under 35 U.S.C. 154(b) by 357 days.

(21) Appl. No.: 17/752,462

(22) Filed: May 24, 2022

(65) Prior Publication Data

US 2022/0384983 A1 Dec. 1, 2022

(30) Foreign Application Priority Data

Jun. 1, 2021 (JP) ................................ 2021-092422

(51) Int. Cl.

| | |
|---|---|
| ***H01R 13/506*** | (2006.01) |
| ***H01R 13/436*** | (2006.01) |
| ***H01R 24/40*** | (2011.01) |
| ***H01R 25/00*** | (2006.01) |

(52) U.S. Cl.

CPC ....... *H01R 13/506* (2013.01); *H01R 13/4362* (2013.01); *H01R 24/40* (2013.01); *H01R 13/4361* (2013.01); *H01R 25/006* (2013.01)

(58) Field of Classification Search

CPC .... H01R 13/506; H01R 24/40; H01R 25/006; H01R 13/436; H01R 13/4361; H01R 13/4362

See application file for complete search history.

(56) References Cited

U.S. PATENT DOCUMENTS

2018/0366843 A1* 12/2018 Maki ..................... H01R 24/42
2023/0253735 A1* 8/2023 Sundarakrishnamachari ............. H01R 13/4223 439/304

FOREIGN PATENT DOCUMENTS

| | | |
|---|---|---|
| CN | 206148708 | 5/2017 |
| DE | 10 2019 119 617 | 1/2020 |
| JP | 2012-221797 A | 11/2012 |
| JP | 2020-13730 A | 1/2020 |

OTHER PUBLICATIONS

CN 206148708 with translation.*

(Continued)

*Primary Examiner* — Renee S Luebke
*Assistant Examiner* — Paul D Baillargeon
(74) *Attorney, Agent, or Firm* — Greenblum & Bernstein, P.L.C.

(57) ABSTRACT

A shell assembly includes a shell including a depression and a flange, which go around a circumference of the shell, and the shell assemblies are arranged in N rows×M columns and fixed to a housing. The housing includes: N×M pieces of insertion holes into which respective ends of the shell assemblies are inserted; an engagement portion that is formed on an inner surface of each of the insertion holes on a position, which is closer to an obliquely-adjacent insertion hole of the insertion holes, and is engaged with the depression; and a slit that is formed by cutting the housing in a direction orthogonal to an extension direction of the insertion holes and includes a first groove and a second groove formed on an inner surface thereof.

4 Claims, 9 Drawing Sheets

(56) References Cited

OTHER PUBLICATIONS

DE 102019119617 with translation.*
Extended European Search Report, European Patent Office, in European Patent Application No. 22171393.6, dated Oct. 19, 2022 (in English).
U.S. Appl. No. 17/745,222 to Yuta Iwamoto, which was filed on May 16, 2022.
Japanese Office Action in counterpart Japanese Patent Application No. JP2021-092422, dated Oct. 8, 2024 (along with English translation thereof).
Japanese Office Action in counterpart Japanese Patent Application No. JP2021-092422, dated Jul. 2, 2024 (along with English translation thereof).

* cited by examiner

MULTIPLE COAXIAL CONNECTOR

TECHNICAL FIELD

The present invention relates to a multiple coaxial connector.

BACKGROUND ART

Japanese Patent Application Laid Open No. 2012-221797 is a conventional example of a connector that is formed by inserting a plurality of cables into one housing.

It is hard to manually insert a plurality of shell assemblies, which include a shell, a body, a contact, and a coaxial cable, into a housing at the same time and fix the shell assemblies in a manner to keep a positional relation of the shell assemblies matched.

SUMMARY OF THE INVENTION

An object of the present invention is to provide a multiple coaxial connector that realizes simple and secure fixation of shell assemblies to a housing.

A multiple coaxial connector according to the present invention includes a shell assembly, a housing, and a retainer.

The shell assembly includes a shell including a depression and a flange which go around a circumference of the shell, a body that is accommodated in the shell, a contact that is accommodated in the body, and a coaxial cable that is connected with the shell and the contact.

The shell assemblies are arranged in N rows in a second direction, the second direction being orthogonal to a first direction that is an extension direction of the shell assembly, and M columns in a third direction that is orthogonal to both of the first direction and the second direction, and the shell assemblies are fixed to the housing. Here, N and M are integers that are 2 or greater.

The housing includes: N×M pieces of insertion holes into which respective ends of the shell assemblies are inserted; an engagement portion that is formed on an inner surface of each of the insertion holes on a position, which is closer to an obliquely-adjacent insertion hole of the insertion holes, and is engaged with the depression; and a slit that is formed by cutting the housing in a direction orthogonal to an extension direction of the insertion holes, communicates with the insertion holes, and includes a first groove and a second groove formed on an inner surface of the slit in an order of longer distance from a center of the housing.

The retainer includes: a claw that is engaged with the first groove and the second groove when the retainer is inserted into the slit; and N pieces of concave portions that do not disturb movement of the shell and the flange in the insertion holes in a temporarily-fixed state in which the claw is engaged with the first groove, and of which each side surface abuts on the flange through insertion of the shell assembly in a fixed state in which the claw is engaged with the second groove.

Effects of the Invention

According to the multiple coaxial connector of the present invention, shell assemblies can be simply and securely fixed to a housing.

DETAILED DESCRIPTION

Figure 1:
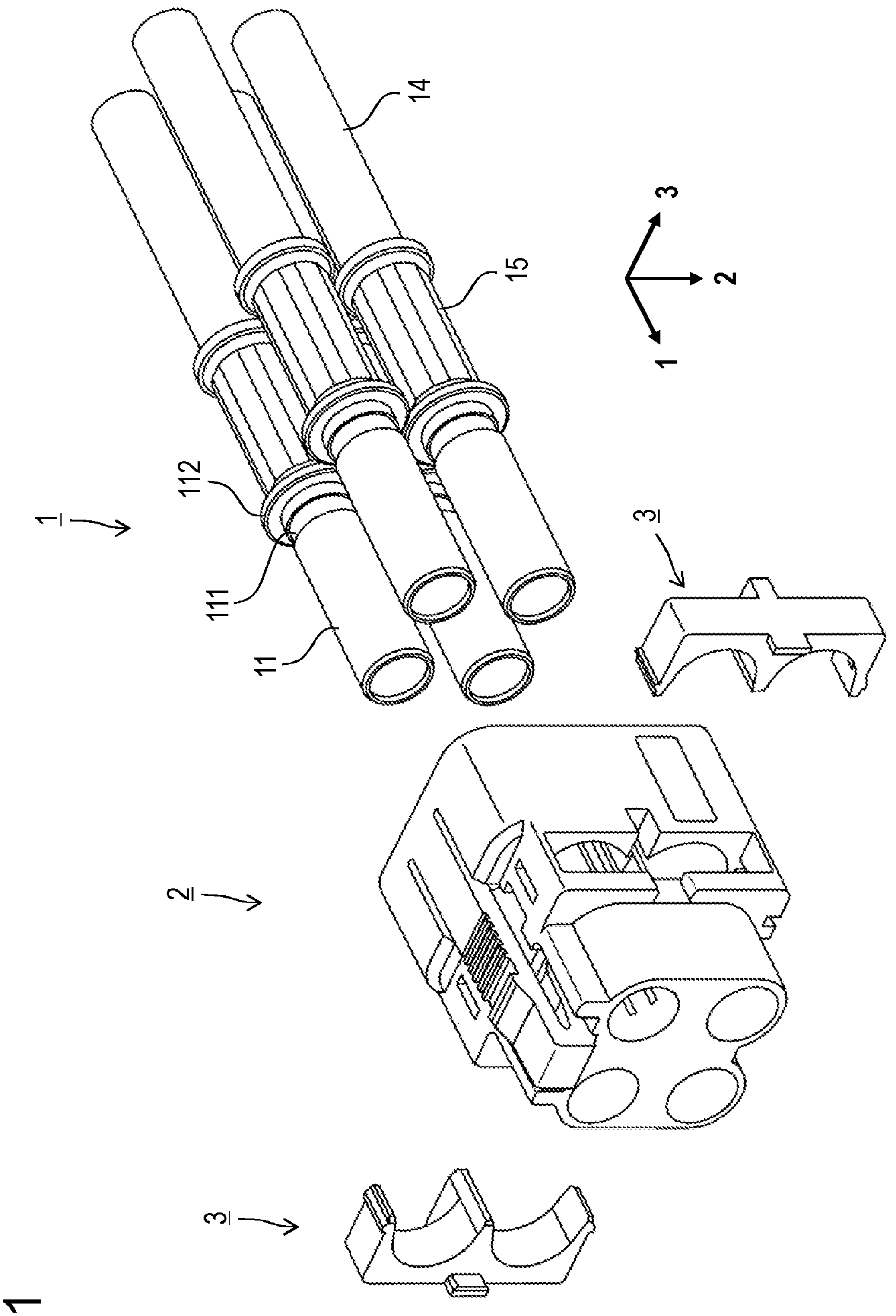
FIG. 1 is an exploded perspective view illustrating a multiple coaxial connector according to a first embodiment.

An embodiment according to the present invention will be described in detail below. Here, components mutually having the same functions will be provided with the same reference numerals and the duplicate description thereof will be omitted.

First Embodiment

Figure 2:
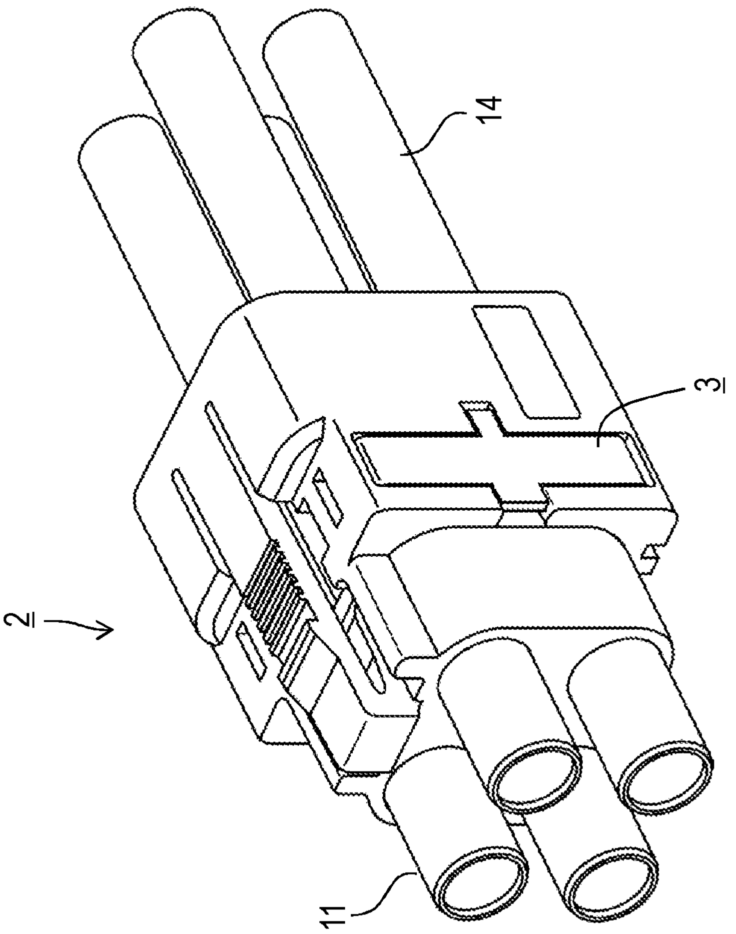
FIG. 2 is a perspective view illustrating the multiple coaxial connector according to the first embodiment.

A structure of a multiple coaxial connector according to a first embodiment will be described with reference to FIGS. 1, 2, and 3. As illustrated in FIGS. 1 and 2, the multiple coaxial connector according to the present embodiment includes shell assemblies 1, a housing 2, and retainers 3.

Figure 3:
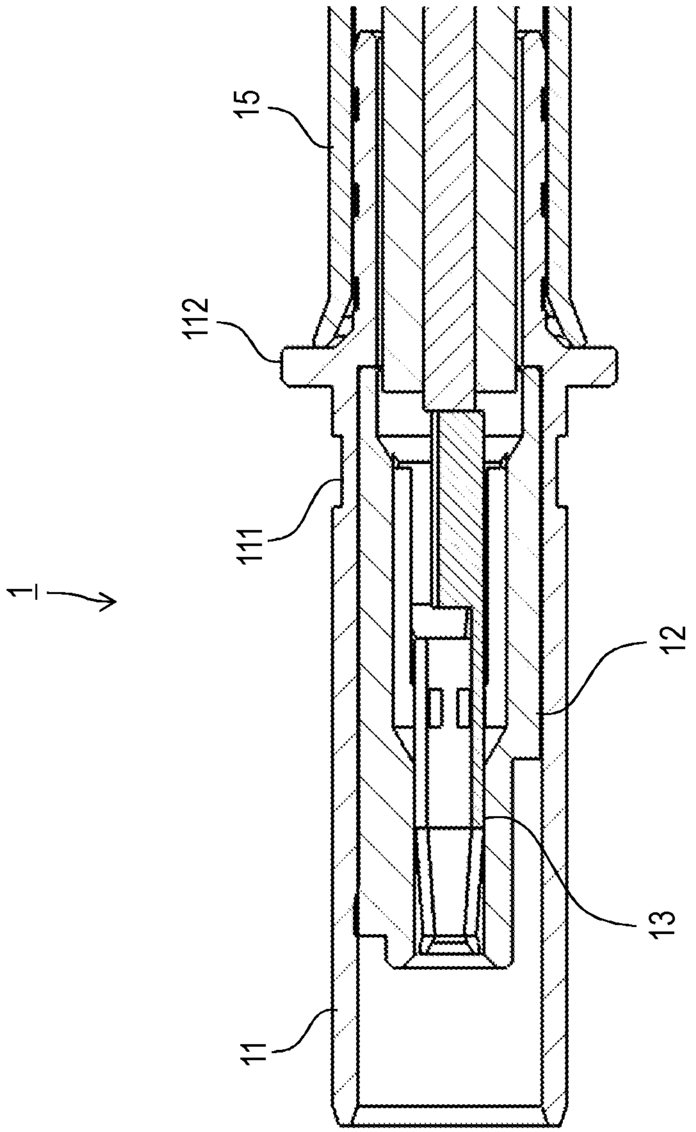
FIG. 3 is a sectional view illustrating a shell assembly according to the first embodiment.

As illustrated in FIGS. 1 and 3, the shell assembly 1 includes a shell 11, a body 12, a contact 13, a coaxial cable 14, and a shield member 15. The shell 11 includes a depression 111 and a flange 112 that go around a circumference of the shell 11. The body 12 is accommodated in the shell 11. The contact 13 is accommodated in the body 12. The coaxial cable 14 is connected with the shell 11 and the contact 13. The shield member 15 covers the coaxial cable 14.

<Shell Assembly 1>

The shell assemblies 1 are arranged in N rows (N is an integer which is 2 or greater) in a second direction (see "2" in bold typeface in FIG. 1 and an arrow direction corresponding to "2") and M columns (M is an integer which is 2 or greater) in a third direction (see "3" in bold typeface in FIG. 1 and an arrow direction corresponding to "3") and these shell assemblies 1 are fixed to the housing 2. The second direction is orthogonal to a first direction (see "1" in bold typeface in FIG. 1 and an arrow direction corresponding to "1") that is an extension direction of the shell assembly 1, and the third direction is orthogonal to both of the first direction and the second direction. In the present embodiment, N=2 and M=2 are set and accordingly, 2×2=4 pieces of the shell assemblies 1 are provided.

<Housing 2>

Figure 4:
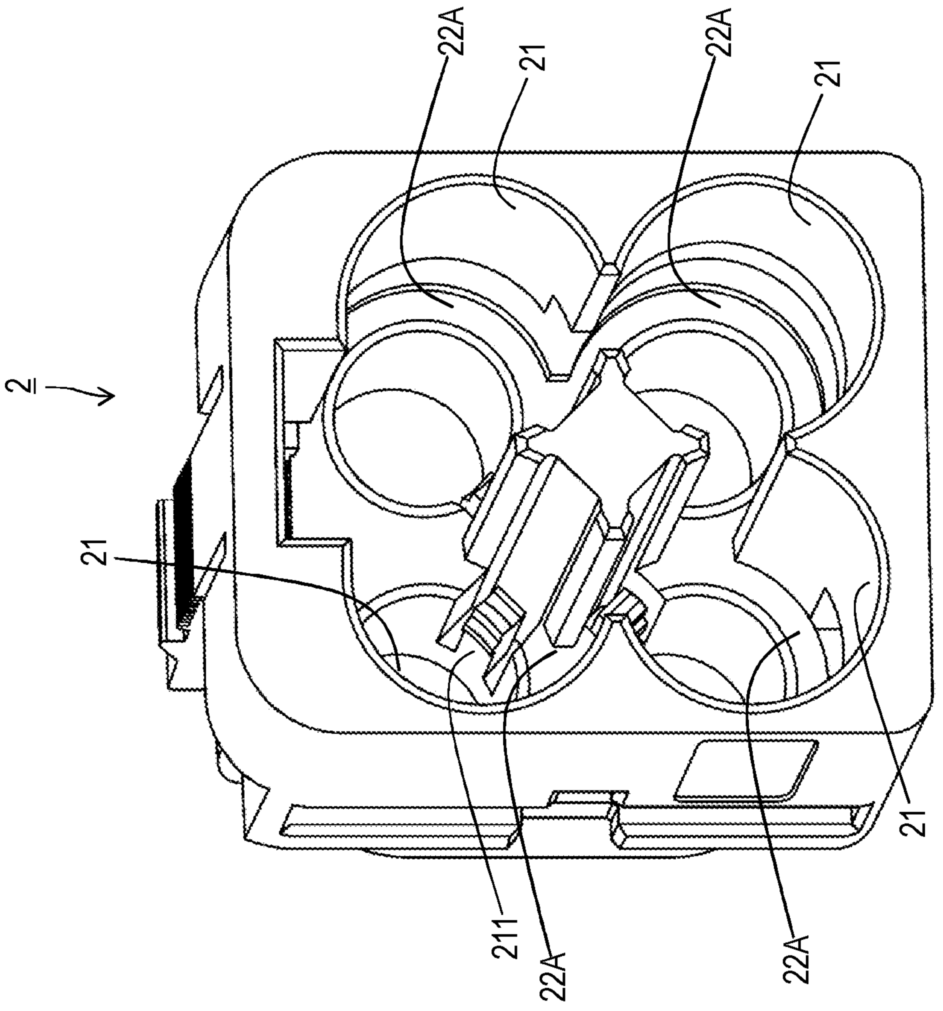
FIG. 4 is a perspective view illustrating a housing.
Figure 5A:
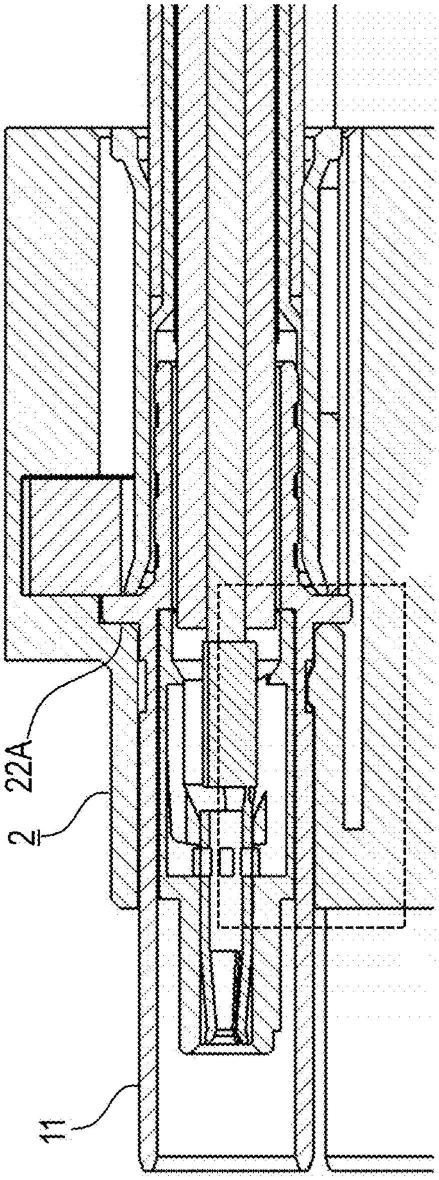
FIG. 5A is a sectional view of a longitudinal cross section, on which a structure of an engagement portion is seen.
Figure 5B:
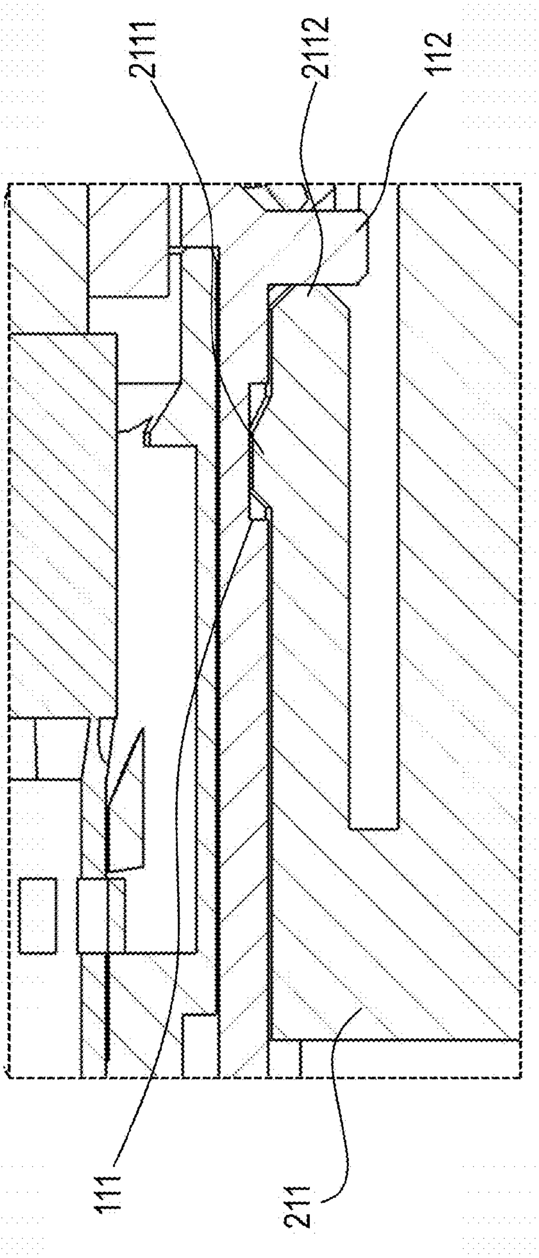
FIG. 5B is a partially enlarged view of the longitudinal cross section of FIG. 5A.
Figure 6:
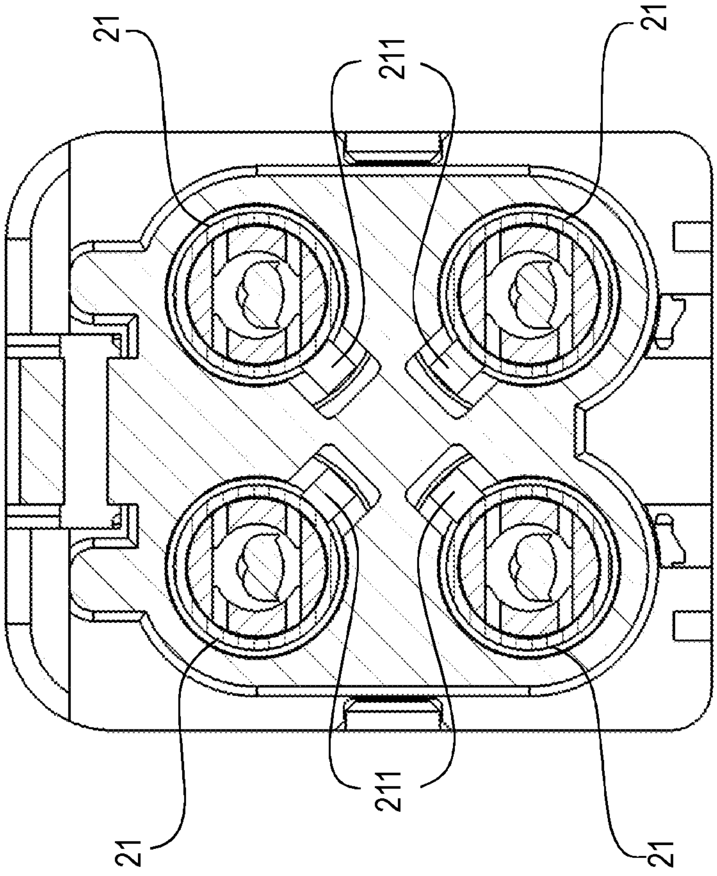
FIG. 6 is a sectional view of a cross section in a short direction, on which a structure of the engagement portion is seen.

A structure of the housing 2 will be described in detail with reference to FIGS. 4 to 7. As illustrated in FIG. 4, the housing 2 includes N×M pieces (2×2 pieces in the present embodiment) of insertion holes 21 into which respective ends of the shell assemblies 1 are inserted. As illustrated in FIGS. 4 and 5A and 5B, the housing 2 includes engagement portions 211 (a half-locked state in the present embodiment). The engagement portion 211 has a protrusion portion 2111 that protrudes toward the inner side of the housing 2 so as to be engaged with the depression 111. The engagement portions 211 are provided on inner surfaces of respective insertion holes 21 on positions that are closer to obliquely-adjacent insertion holes 21, as illustrated in FIGS. 4 and 6.

The engagement portion 211 can be realized by a resin spring, for example. In the present embodiment, the engagement portion 211 once elastically deforms in an outside direction of the housing 2 when the shell 11 is pressed into the insertion hole 21. Then, the protrusion portion 2111 of the engagement portion 211 falls into the depression 111 and the engagement portion 211 elastically returns in an inside direction of the housing 2. An abutment surface 22A of the housing 2 abuts on the flange 112 at the same time with or immediately after the elastic return. Positioning between the housing 2 and the shell assembly 1 is thus performed (FIGS. 5A and 5B).

Figure 7:
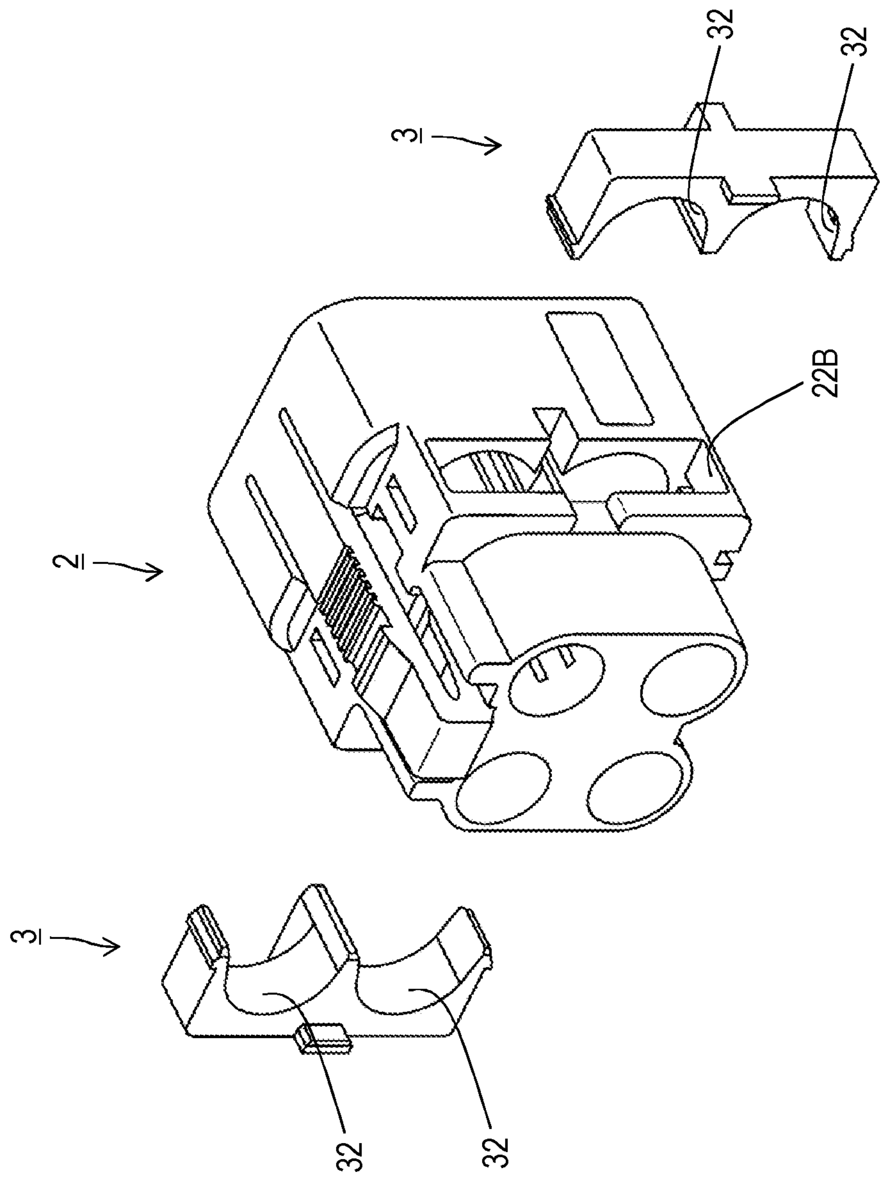
FIG. 7 is a perspective view illustrating structures of a slit formed on the housing and a retainer.
Figure 8:
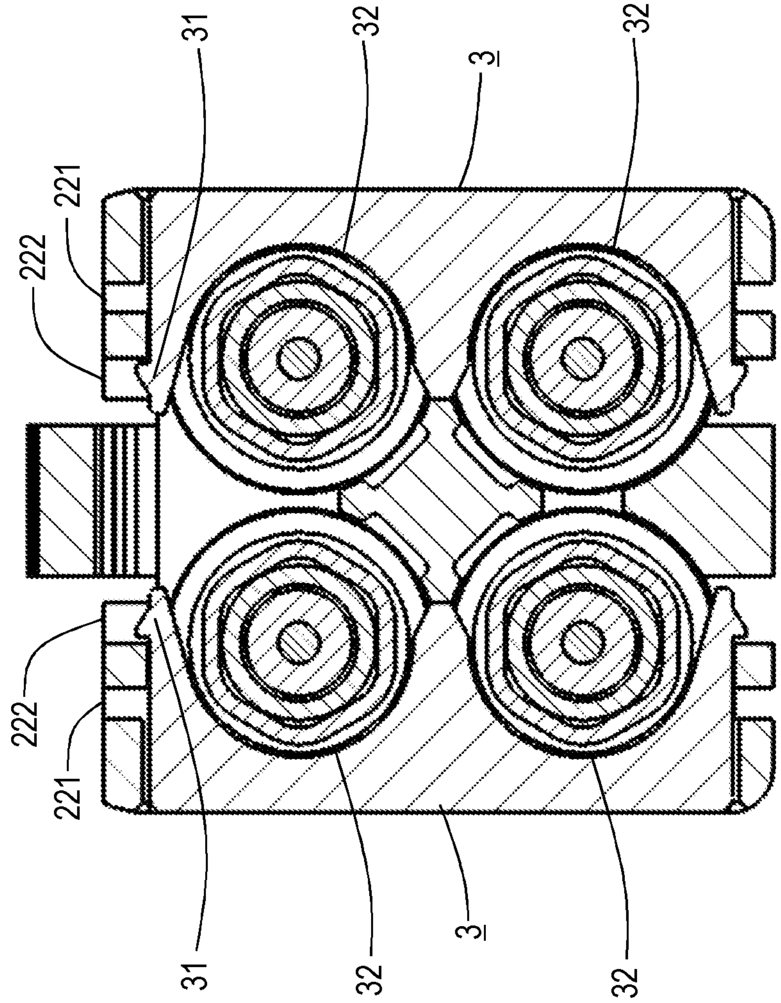
FIG. 8 is a sectional view of a cross section in the short direction, on which a structure of the retainer is seen.

However, it cannot be said that the shell assemblies 1 are sufficiently locked at this stage especially with respect to a force in a pulling-out direction. Accordingly, fixation with the retainers 3 described later is performed. The housing 2 includes slits 22B that are formed by cutting the housing 2 in a direction orthogonal to the extension direction of the insertion hole 21, as illustrated in FIG. 7. The slit 22B communicates with the insertion hole 21 and a first groove 221 and a second groove 222 are formed on the inner surface of the slit 22B in an order of longer distance from the center of the housing 2, as illustrated in FIG. 8. In the present embodiment, the slits 22B are provided as a pair on opposing surfaces of the housing 2.

<Retainer 3>

In the present embodiment, two retainers 3 are respectively inserted into two slits 22B. The retainer 3 includes claws 31 that are engaged with the first grooves 221 and the second grooves 222 when the retainer 3 is inserted into the slit 22B, and N pieces (two pieces in the present embodiment) of concave portions 32, as illustrated in FIGS. 7 and 8.

The concave portions 32 are formed so that the concave portions 32 do not disturb movement of the shells 11 and flanges 112 in the insertion holes 21 in a temporarily-fixed state in which the claws 31 are engaged with the first grooves 221, and formed so that side surfaces of the concave portions 32 abut on the flanges 112 through insertion of the shell assemblies 1 in a fixed state in which the claws 31 are engaged with the second grooves 222.

When the side surface of the concave portion 32 is formed in a shape abutting on the flange 112 by a half or greater length of the circumference of the flange 112, the shell assemblies 1 can be more firmly fixed to the housing 2, thus being preferable.

<Advantageous Effect: Engagement Portion 211>

The engagement portions 211 (resin springs) of the multiple coaxial connector according to the present embodiment are formed on the inner surfaces of respective insertion holes 21 on the positions that are closer to obliquely-adjacent insertion holes 21, that is, formed closer to the center of the connector. Accordingly, the outer shape of the connector can be downsized.

Since each of the engagement portions 211 (resin springs) of the multiple coaxial connector according to the present embodiment is formed closer to the center of the multiple coaxial connector, the engagement portions 211 can be formed in the same shape as each other. All of the engagement portions 211 (resin springs) have the same shapes as each other, being expected to simplify a design considering a spring property, simplify a mold design, and reduce maintenance cost as core parts can be shared through mold maintenance.

As described above, each of the engagement portions 211 of the multiple coaxial connector according to the present embodiment is arranged closer to the center of the housing 2. This structure equalizes material filling time from a gate position to the engagement portions 211 (resin springs) in housing molding and thus provides an advantageous effect that molding condition management for preventing short shot becomes easy, for example.

<Advantageous Effect: Engagement Portion 211=Half-Locked State>

The insertion holes 21 corresponding to respective shell assemblies 1 are predetermined, but the shell assemblies 1 may be inserted into wrong insertion holes 21. In this case, if the engagement portions 211 are engaged with the shells 11 in a fully-locked state, a special jig for displacing the engagement portions 211 is required to pull out the shells 11 from the housing 2. The pulling-out work using a special jig is affected by the length and own weight of a cable, largely deteriorating workability. Further, there is a possibility that the engagement portions 211 are damaged depending on the own weight of the cable. When the engagement portions 211 are engaged with the shells 11 in a half-locked state, the shells 11 can be pulled out from the housing 2 without damaging the engagement portions 211, making reworking in a case of miswiring easy.

<Advantageous Effect: Retainer 3>

The protrusion portion 2111 which is engaged with the depression 111 cannot be enlarged because of the structure and therefore, an area of the engagement portion 211 abutting on the shell 11 is small. This brings a structural problem that the protrusion portion 2111 is damaged and the shell assembly 1 falls out of the housing 2 when a load is applied to the shell assembly 1 in a pulling-out direction. On the other hand, the shell assemblies 1 directly abut on the retainers 3 and are completely fixed to the housing 2 and therefore, a pulling-out bearing force can be controlled without depending on the engagement portions 211 in the completely-fixed state.

When the structure is employed in which the retainers 3 abut on the flanges 112 of the shells 11 as described above, the abutting area on the flanges 112 can be made larger than an abutting area of the protrusion portions 2111 of the engagement portions 211. This structure makes it easy to realize and maintain a required pulling-out bearing force of the shell assemblies 1.

Figure 9:
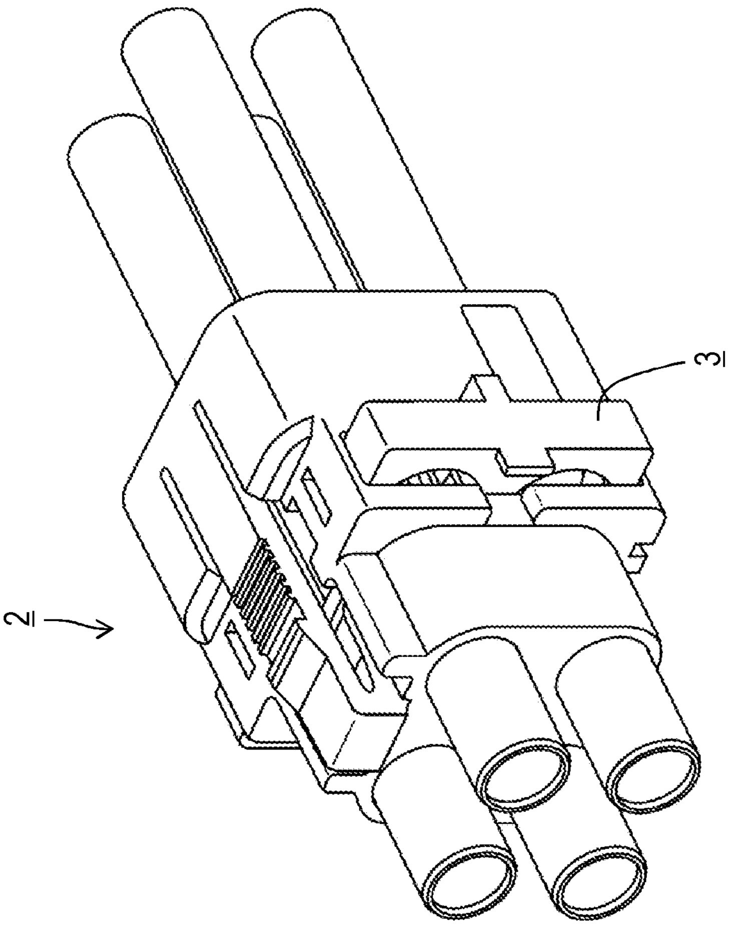
FIG. 9 is a perspective view illustrating a state in which retainers of the multiple coaxial connector according to the first embodiment are inserted up to temporarily-fixing positions.

As illustrated in FIG. 9, the shell assemblies 1 can be inserted into the housing 2 in a state in which the retainers 3 are on temporarily-fixing positions and therefore, a working process for completely fixing the retainers 3 is simplified.

Since the retainers 3 can be temporarily fixed on the housing 2, the retainers 3 can be provided in a temporarily-assembled state when providing the retainers 3 to a user as service parts. Thus, there are advantageous effects for facilitating inventory management and improving workability.

Even though man-hour is increased because of the addition of the process for temporarily assembling the retainers 3, workability deterioration caused by the own weight of the coaxial cable 14 can be prevented and a process after insertion of the shell assemblies 1 can be simplified, being able to shorten total working time.

A jig for the process of completely fixing the retainers 3 can be also simplified (manual assembly without using any jig is possible).

Since the retainers 3 are provided as a pair and are inserted in respective slits 22B as described above, the abutting area between the retainers 3 and the flanges 112 of the shells 11 can be enlarged and the pulling-out bearing force is improved.

<Modification>

The first embodiment discloses the example of N=2 and M=2. However, similar advantageous effects can be obtained even when the shell assemblies 1 and the insertion holes 21 are arranged, for example, in two rows and three columns or three rows and three columns.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A multiple coaxial connector comprising:

a shell assembly;

a housing; and a retainer, wherein the shell assembly includes a shell that includes a depression and a flange, the depression and the flange going around a circumference of the shell, a body that is accommodated in the shell, a contact that is accommodated in the body, and a coaxial cable that is connected with the shell and the contact, a plurality of the shell assemblies are provided and the shell assemblies are arranged in N rows in a second direction, the second direction being orthogonal to a first direction that is an extension direction of the shell assembly, and M columns in a third direction, the third direction being orthogonal to both of the first direction and the second direction, and the shell assemblies are fixed to the housing, where N and M are integers that are 2 or greater, the housing includes N×M pieces of insertion holes into which respective ends of the shell assemblies are inserted, an engagement portion that is formed on an inner surface of each of the insertion holes on a position, the position being closer to an obliquely-adjacent insertion hole of the insertion holes, and is engaged with the depression, and a slit that is formed by cutting the housing in a direction orthogonal to an extension direction of the insertion holes, communicates with the insertion holes, and includes a first groove and a second groove, the first groove and the second groove being formed on an inner surface of the slit, wherein the first groove is a longer distance from a center of the housing than the second groove, and the retainer includes a claw that is engaged with the first groove and the second groove when the retainer is inserted into the slit, and N pieces of concave portions that do not disturb movement of the shell and the flange in the insertion holes in a temporarily-fixed state in which the claw is engaged with the first groove, and of which each side surface abuts on the flange through insertion of the shell assembly in a fixed state in which the claw is engaged with the second groove, wherein the engagement portion is engaged with the depression in a half-locked state, and the half-locked state is a state in which a lock between the housing and the shell is released when a specified load is applied in an extraction direction of the shell.

2. The multiple coaxial connector according to claim 1, wherein a plurality of pieces of the slits are provided as a pair on respective opposing surfaces of the housing, and two pieces of the retainers are provided and the two retainers are inserted from respective slits.

3. The multiple coaxial connector according to claim 1, wherein the side surface of the concave portions has a shape abutting on the flange by a half or greater length of a circumference of the flange.

4. The multiple coaxial connector according to claim 2, wherein the side surface of the concave portions has a shape abutting on the flange by a half or greater length of a circumference of the flange.

* * * * *